(12) United States Patent
Van Hooren

(10) Patent No.: US 6,805,168 B2
(45) Date of Patent: Oct. 19, 2004

(54) MULTILAYER HOSE

(75) Inventor: Marc Van Hooren, Gelnhausen (DE)

(73) Assignee: Veritas AG, Gelnhausen (DE)

( * ) Notice: Subject to any disclaimer, the term of this patent is extended or adjusted under 35 U.S.C. 154(b) by 0 days.

(21) Appl. No.: 10/274,947

(22) Filed: Oct. 22, 2002

(65) Prior Publication Data

US 2003/0084949 A1 May 8, 2003

(30) Foreign Application Priority Data

Oct. 24, 2001 (DE) .......................................... 101 52 575

(51) Int. Cl.$^7$ ............................................... F16L 11/08
(52) U.S. Cl. ........................ 138/137; 138/126; 138/140; 138/141; 138/125; 428/36.91
(58) Field of Search ................................. 138/137, 140, 138/141, 126, 124, 125, 127, DIG. 3; 428/36.91

(56) References Cited

U.S. PATENT DOCUMENTS

| | | | | |
|---|---|---|---|---|
| 4,303,457 A | * | 12/1981 | Johansen et al. | 156/149 |
| 6,089,277 A | * | 7/2000 | Kodama et al. | 138/126 |
| 6,090,459 A | * | 7/2000 | Jadamus et al. | 428/36.4 |
| 6,310,141 B1 | * | 10/2001 | Chen et al. | 525/199 |
| 6,443,185 B1 | * | 9/2002 | Katayama et al. | 138/137 |
| 6,489,420 B1 | * | 12/2002 | Duchesne et al. | 526/255 |
| 6,538,069 B2 | * | 3/2003 | Faulkner | 525/199 |
| 2002/0006488 A1 | | 1/2002 | Franosch et al. | 428/36.9 |
| 2002/0106470 A1 | * | 8/2002 | Merziger et al. | 428/36.91 |

FOREIGN PATENT DOCUMENTS

| | | |
|---|---|---|
| DE | 19507025 A1 | 9/1996 |
| DE | 19641946 A1 | 4/1998 |
| EP | 0582301 A1 | 2/1994 |
| EP | 0730115 B1 | 9/1996 |
| WO | WO99/36194 | 7/1999 |

* cited by examiner

Primary Examiner—Patrick Brinson
(74) Attorney, Agent, or Firm—Burns, Doane, Swecker & Mathis, L.L.P.

(57) ABSTRACT

The present invention relates to a multilayer hose, especially for conveying fuel, comprising an outer layer and a conductive, fluorine-containing, elastomeric inner layer, said inner layer comprising a fluorine-containing elastomer mixed with graphite.

24 Claims, 1 Drawing Sheet

MULTILAYER HOSE

This application claims priority under 35 U.S.C. §§119 and/or 365 to Appln No. 101 52 575.3 filed in Germany on Oct. 24, 2001; the entire content of which is hereby incorperated by reference.

FIELD OF THE INVENTION

The present invention relates to a multilayer hose, especially for conveying fuel, comprising an outer layer and a conductive, fluorine-containing, elastomeric inner layer.

BACKGROUND OF THE INVENTION

EP 582 301 discloses a corresponding multilayer tube comprising a barrier layer implemented as an inner layer and consisting of a fluorothermoplastic, an intermediate layer consisting of a rubber material, and an outer layer consisting of a rubber material. The fluorothermoplastic of the inner layer can here contain a conductive additive, e.g. carbon black or stainless steel fibres. This conductive additive is added for imparting to the tube excellent fireproofness and for protecting it against electrostatic charging.

In addition, it is also known to provide elastomer mixtures with an antistatic and conductive finish by making use of special conductivity carbon blacks of high activity, i.e. carbon black with a small particle size and a large surface.

This known use can, however, not easily be transferred to fluoroelastomers, since, due to the highly increasing effect of such types of carbon black, this kind of conductive, i.e. antistatic adjustment leads to insufficient physical and dynamic properties of the finished component. Furthermore, the fluoroelastomer mixture having carbon black particles added thereto in this way shows very poor processing properties in the extrusion process.

SUMMARY OF THE INVENTION

It is therefore the object of the present invention to provide a multilayer hose which comprises a fluoroelastomer barrier layer and which is characterized not only by a good processability but also by good properties when in use. This object is achieved by a multilayer hose of the type known, which is provided with an inner layer that comprises a fluorine-containing elastomer mixed with graphite.

The multilayer hose provided fulfills the demands on fuel hoses particularly well. The use of graphite as a conductive additive to the fluorine-containing elastomer mixture achieves good rheological properties with respect to the processability. In contrast to carbon black, graphite is physically inert, i.e. the filler-polymer interaction and consequently, the increasing effect due to the lack of a mechanical toothing is markedly less strong. These mixtures show reliable processing properties, both during production as well as during extrusion of the mixture.

Multilayer fuel hoses with conductive fluoroelastomers as an inner and barrier layer have, in comparison with known hoses including barrier layers of fluorothermoplastics, a higher flexibility, damping and a higher dynamic stressability of the respective components.

According to a preferred embodiment, the fluorine-containing elastomer of said inner layer can be a HFP/VDF/ TFE terpolymer or a VDF/HFP copolymer. The terpolymer can have a fluorine content of at least 69% and the copolymer can have a fluorine content of at least 65%.

Practical experience has shown that the requirements that have to be fulfilled by the inner layer, which is in contact with the fuel, are satisfied particularly well by this material. The material is sufficiently resistant to fuels and provides also a good blocking effect.

In accordance with an advantageous embodiment, the graphite can be added to said fluorine-containing elastomer in the form of a graphite powder. The graphite powder used may, in particular, be a synthetic graphite powder.

According to a preferred embodiment, the graphite powder can have an average particle diameter of less than 4 pm.

The above-mentioned particle diameter proved to be particularly suitable, especially with respect to the good processability of the material and the conductive properties.

The surface resistivity of the inner layer can here be $10^9\Omega$ at the most and, preferably, it can be less than $10^6\Omega$.

Practical experience has shown that these values are suitable for the intended use.

In accordance with an advantageous embodiment, the hose can contain 15–30 parts by weight of graphite per 100 parts by weight of polymer.

According to a further embodiment, an intermediate layer can be arranged between said outer layer and said inner layer.

The intermediate layer can consist of an elastomer. Preferably, the elastomer is selected from the group comprising CR, CPE, EVM, NBR, CSM, ECO, AEM, ACM, and VMQ.

In accordance with an advantageous embodiment, the outer layer and the intermediate layer can have additionally provided between them a reinforcing layer. This reinforcing layer may consist of nylon fibres, cotton fibres, cellulose fibres, Rayon fibres, polyester fibres or aramid fibres or of a high-modal twisted yarn, which are applied to said intermediate layer by knitting, winding or braiding them therearound.

The strength of the hose according to the present invention can be increased still further in this way.

Furthermore, the hose can be so conceived that the outer layer consists of an elastomer. The elastomer can here be selected from the group comprising CPE, EVM, NBR, CR, CSM, ECO, AEM, ACM and VMQ.

The materials mentioned hereinbefore for the intermediate layer and the outer layer proved to be particularly useful with respect to their properties for the intended use according to the present invention as well as with respect to the connection between the individual layers.

According to a further preferred embodiment, the thicknesses of the individual layers can be as follows: inner layer 0.4 mm to 1.2 mm, intermediate layer 0.5 mm to 1.2 mm and outer layer 0.8 mm to 1.7 mm.

Furthermore, the following thicknesses can prove to be useful for the respective layers: inner layer 0.6 mm to 1.0 mm, intermediate layer 0.7 mm to 1.0 mm and outer layer 1.0 mm to 1.5 mm.

In accordance with an advantageous embodiment, the thicknesses of the individual layers can be as follows:

inner layer 0.7 mm to 0.8 mm, intermediate layer 0.8 mm to 0.9 mm and outer layer 1.2 mm to 1.3 mm.

Practical experience has shown that these layer thicknesses are particularly suitable with respect to the requirements that have to be fulfilled by the hose.

It will be advantageous when the intermediate layer contains an adhesion promoter.

This will guarantee an improved connection between the intermediate layer and the layers located adjacent thereto, whereby the service life of the hose will be increased as well.

BRIEF DESCRIPTION OF THE DRAWINGS

In the following, a preferred embodiment of the present invention will be explained in detail making reference to a drawing, in which.

Figure 1:
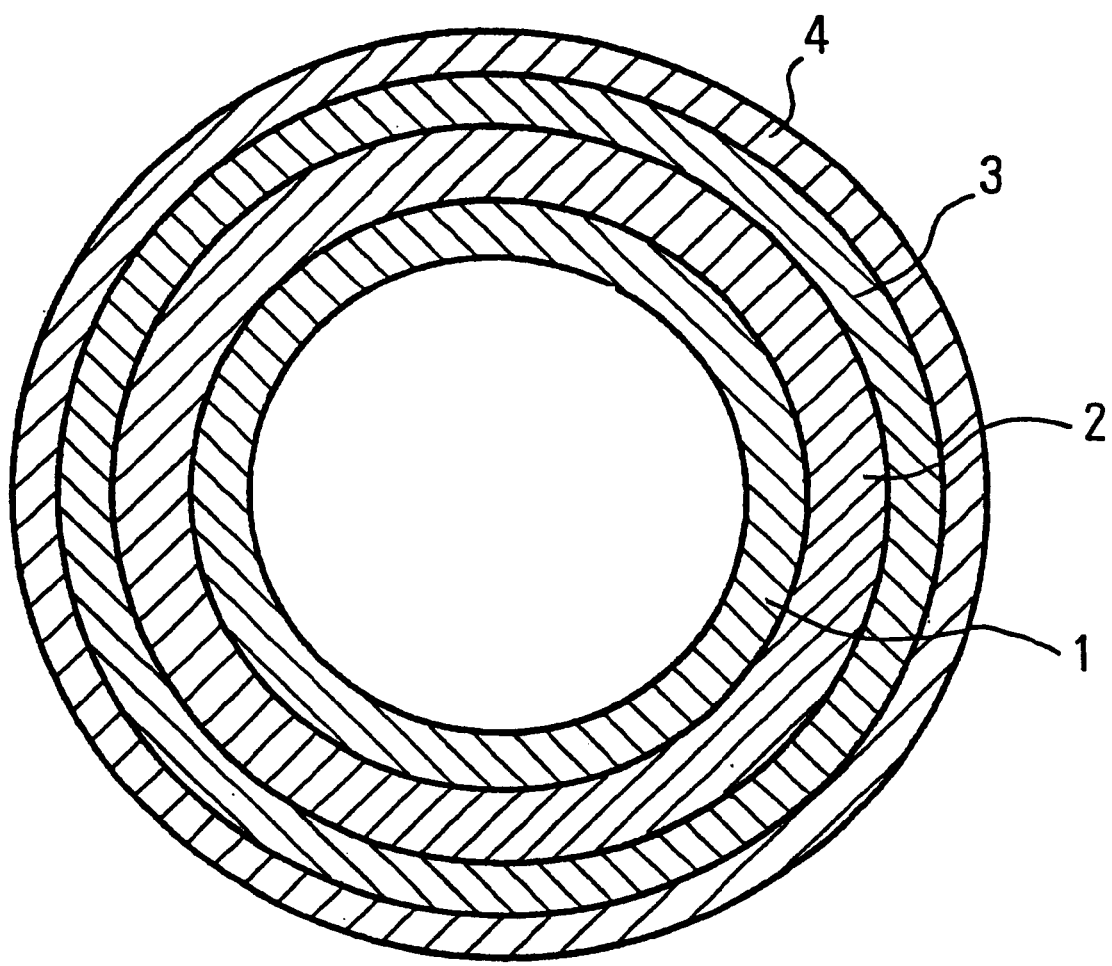
FIG. 1 shows a cross-section through a multilayer hose according to the present invention.

The hose shown in FIG. 1 comprises a first inner layer 1 consisting of a VDF/HFP copolymer mixed with graphite, or, preferably, of a HFP/VDF/TFE terpolymer. These materials provide a sufficient blocking effect against the media conducted through the installed hose. Due to the admixture of graphite, an antistatic and conductive finish of the elastomer is achieved.

DETAILED DESCRIPTION OF THE INVENTION

The terpolymer is preferably characterized by a fluorine content of at least 69% and a Mooney viscosity ($ML_{1+10}$ 100° C.) of less than 65. Furthermore, it is adapted to be diamine-, bisphenol- or preferably peroxide-cross-linked.

The first layer is followed by a second layer 2 consisting of an elastomer. The elastomer will preferably be selected from the group comprising CR, CPE, EVM, NBR, CSM, ECO, AEM, ACM and VMQ. Furthermore, the second layer may have added thereto an adhesion promoter so as to improve the connection between the individual layers.

The outer layer 4 will also be formed by an elastomer, preferably CPE, EVM, NBR, CR, CSM, ECO, AEM, ACM or VMQ.

The outer layer 4 and the intermediate layer 2 have additionally arranged between them a reinforcing layer 3 which contributes to an increase in the strength of the hose. Materials which proved to be particularly suitable for the reinforcing layer 3 are especially cotton fibres, cellulose fibres, Rayon fibres, nylon fibres, polyester fibres or aramid fibres as well as high-modal twisted yarn.

A preferred composition of the material forming the inner layer is as follows:

| | |
|---|---|
| fluororubber | 100 |
| graphite | 15–30 |
| carbon black MT 990/N772 | 8–14 |
| acid acceptor | 0–4 |
| coactivator | 2–5 |
| peroxide | 2–4 |
| processing agent | 0.5–1. |

What is claimed is:

1. A multilayer hose, suitable for conveying fuel, comprising an outer layer and a conductive, fluorine-containing, elastomeric inner layer, wherein the inner layer consists essentially of a fluorine-containing elastomer mixed with graphite.

2. A multilayer hose, suitable for conveying fuel, comprising an outer layer and a conductive, fluorine-containing, elastometic inner layer, wherein the inner layer comprises a fluorine-containing elastomer mixed with graphite; and the fluorine-containing elastomer of said inner layer is a HFP/VDF/TFE terpolymer.

3. A multilayer hose according to claim 2, wherein the terpolymer has a fluorine content of at least 69%.

4. A multilayer hose according to claim 1, wherein the fluorine-containing elastomer of said inner layer is a VDF/HFP copolymer.

5. A multilayer hose according to claim 4, wherein the copolymer has a fluorine content of at least 65%.

6. A multilayer hose according to claim 1, wherein the graphite is added to said fluorine-containing elastomer in the form of a graphite powder.

7. A multilayer hose, suitable for conveying fuel, comprising an outer layer and a conductive, fluorine-containing, elastomeric inner layer, wherein the inner layer comprises a fluorine-containing elastomer mixed with graphite; the graphite is added to said fluorine-containing elastomer in the form of a graphite powder; and the graphite powder is a synthetic graphite.

8. A multilayer hose, suitable for conveying fuel, comprising an outer layer and a conductive, fluorine-containing, elastomeric inner layer, wherein the inner layer comprises a fluorine-containing elastomer mixed with graphite; the graphite is added to said fluorine-containing elastomer in the form of a graphite powder; and the graphite powder has an average particle size of less than 4 $\mu$m.

9. A multilayer hose according to claim 1, wherein the surface resistivity of said inner layer is $10^9 \Omega$ at the most.

10. A multilayer hose, suitable for conveying fuel, comprising an outer layer and a conductive, fluorine-containing, elastomeric inner layer, wherein the inner layer comprises a fluorine-containing elastomer mixed with graphite; and the fluorine-containing elastomer contains 15–30 parts by weight of graphite per 100 parts by weight of polymer.

11. A multilayer hose according to claim 1, wherein an intermediate layer is arranged between said outer layer and said inner layer.

12. A multilayer hose according to claim 11, wherein the intermediate layer comprises an elastomer.

13. A multilayer hose according to claim 12, wherein the elastomer of the intermediate layer is selected from the group consisting of CR, CPE, EVM, NBR, CSM, ECO, AEM, ACM, and VMQ.

14. A multilayer hose according to claim 1, wherein the outer layer and the intermediate layer have additionally provided between them a reinforcing layer.

15. A multilayer hose according to claim 14, wherein the reinforcing layer comprises cotton fibres, cellulose fibres, Rayon fibres, nylon fibres, polyester fibres or aramid fibres or, a high-modal twisted yarn which is applied to said intermediate layer by knitting, winding or braiding the yarn therearound.

16. A multilayer hose according to claim 1, wherein the outer layer comprises an elastomer.

17. A multilayer hose according to claim 16, wherein the elastomer of said outer layer is selected from the group consisting of CPE, EVM, NBR, CR, CSM, ECO, AEM, ACM and VMQ.

18. A multilayer hose according to claim 1, wherein the thicknesses of the individual layers are as follows: inner layer 0.4 mm to 1.2 mm, intermediate layer 0.5 mm to 1.2 mm and outer layer 0.8 mm to 1.7 mm.

19. A multilayer hose according to claim 1, wherein the thicknesses of the individual layers are as follows: inner layer 0.6 mm to 1.0 mm, intermediate layer 0.7 mm to 1.0 mm and outer layer 1.0 mm to 1.5 mm.

20. A multilayer hose according to claim 1, wherein the thicknesses of the individual layers are as follows: inner layer 0.7 mm to 0.8 mm, intermediate layer 0.8 mm to 0.9 mm and outer layer 1.2 mm to 1.3 mm.

21. A multilayer hose according to claim 1, wherein the intermediate layer contains an adhesion promoter.

22. A multilayer hose according to claim 9, wherein the surface resistivity of said inner layer is less than $10^6 \Omega$.

23. A multilayer hose according to claim 2, wherein the inner layer consists essentially of the HFP/VDF/TFE terpolymer mixed with graphite.

24. A multilayer hose, suitable for conveying fuel, comprising an outer layer and a conductive, fluorine-containing, elastomeric inner layer, wherein the inner layer comprises a fluorine-containing elastomer mixed with graphite, and the inner layer does not contain carbon black.

* * * * *